United States Patent

[11] 3,564,265

| [72] | Inventors | Konrad Bunge<br>Cologne-Stammheim;<br>Otto Koch; Bernhard Vinzelberg; Guenther Koepke, Leverkusen; Georg Braeuniger, Cologne-Flittard, Germany |
|---|---|---|
| [21] | Appl. No. | 691,469 |
| [22] | Filed | Dec. 18, 1967 |
| [45] | Patented | Feb. 16, 1971 |
| [73] | Assignee | Farbenfabriken Bayer Aktiengesellschaft<br>Leverkusen, Germany |

[54] APPARATUS FOR DETECTING AND LOCATING STREAKS ON MOVING WEBS IN THE PRODUCTION OF PHOTOGRAPHIC PAPERS AND FILMS
7 Claims, 4 Drawing Figs.

[52] U.S. Cl. .................................................. 250/234
[51] Int. Cl. .................................................. G01n 21/32
[50] Field of Search .......................................... 250/219
(F), 234, 222, 218; 356/201—203; 250/219 (Th)

[56] References Cited
UNITED STATES PATENTS

| 3,230,305 | 1/1966 | Kendrick...................... | 250/219X |
| 3,439,175 | 4/1969 | Kammuller et al. .......... | 250/219X |
| 1,917,379 | 7/1933 | Lowry ........................... | 250/219X |
| 2,773,412 | 12/1956 | Huck............................. | 250/234X |
| 3,206,606 | 9/1965 | Burgo et al. ................. | 250/219 |
| 3,308,658 | 3/1967 | Bryan............................ | 250/234X |
| 2,968,988 | 1/1961 | Crosfield...................... | 250/234X |

Primary Examiner—Walter Stolwein
Attorney—Burgess, Dinklage & Sprung

ABSTRACT: In the production of supported films wherein a liquid medium is deposited on a light reflecting support, the steps of inspecting to determine irregularities in the supported film which comprise directing a light beam to the deposited liquid medium including light of a wave length absorbed by the deposited liquid medium, for reflection by the light reflecting support, and sensing variation is absorption of said light beam by the liquid medium.

3,564,265
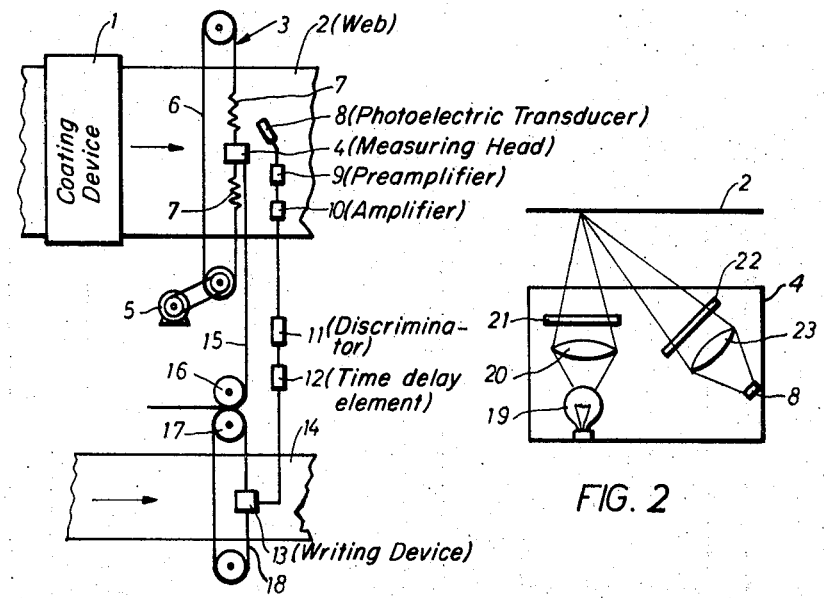
FIG. 1
FIG. 2
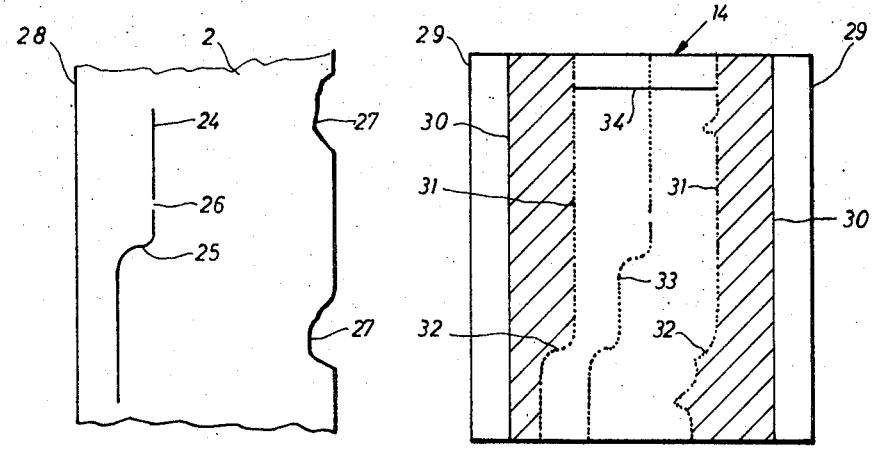
FIG. 3
FIG. 4
INVENTORS:
KONRAD BUNGE, OTTO KOCH, BERNHARD VINZELBERG, GÜNTHER KOEPKE, GEORG BRÄUNIGER,
BY

APPARATUS FOR DETECTING AND LOCATING STREAKS ON MOVING WEBS IN THE PRODUCTION OF PHOTOGRAPHIC PAPERS AND FILMS

BACKGROUND

This invention relates to an apparatus and to a process for detecting and locating streaks or other faults on moving webs used in the production of photographic papers and films in which a measuring head equipped with a light source and a photoelectric transducer is mounted on a conveyor device so that it is reciprocally movable over the moving web which is scanned by a beam of light.

In the simplest and best known method for detecting streaks when coating photographic papers or films, the moving web is observed by the naked eye in oblique reflected light during the coating operation, or the finished coated web is checked under the same conditions. This method is uncertain. In another method which is very complicated and time-consuming, the finished web is checked by a statistical method in which pieces are cut out of the web, exposed and developed. All these methods are too subjective and therefore too unreliable.

Processes and apparatuses for detecting streaks have been developed with particular applicability to the manufacture of paper. In these systems a light beam is passed over the paper web perpendicularly to the direction of movement of the web. The main purpose of these apparatuses, however, is to find for example patches or holes rather than to detect streaks. Another apparatus is known which is provided with a special electronic interpretation channel for detecting streaks. In this apparatus, the faults that are indicated in the course of scanning with the light beam and which follow successively in the direction of movement of the web are summated. This method, however, can only be used for detecting streaks if the noise is not too large.

All the known apparatuses have serious disadvantages when used for the detection of streaks because they are only suitable for the detection of streaks at a high signal/noise ratio, and this ratio is often by no means large. Thus, for example, in the use of a particularly important detecting operation, namely that of detecting streaks when coating photographic papers or films, the light power available for the detection of the streaks is very small. On the other hand, the known detecting apparatuses are very complicated and expensive and, in addition, one must also use further expansive apparatus for interpreting and recording the results.

THE INVENTION

In summary, the invention provides improvements in apparatus for detecting and locating streaks on moving webs being coated in the production of photographic papers and films, in which a measuring head equipped with a light emitting device and a photoelectric transducer is arranged on a conveyor device so that it may be reciprocally moved over the moving web. According to the invention, the measuring head is coupled with a recording device working syncroneously with the moving web. The measuring head is arranged in the region of the web that is still wet. The light emitting device comprises a filament or ribbon lamp and means for imaging the filament or ribbon onto the web, and the beam of the light emitting means includes light in the wavelength region of absorption of the liquid wetting the web.

The difficulties which arise with the apparatus known in the art for use in the detection of streaks can be overcome with the apparatus according to the present invention in a surprisingly simple manner by the use of an optical measuring head which inspects the web immediately behind the coating device in an area where the layer is still wet, by means of a light emitting device, preferably a source of infrared light which preferably emits light within the range of wavelengths of the water absorption band of $2\mu$, and which is connected to an indicator device. For example, when the device is used for detecting streaks on photographic paper, it operates in the following manner: the incident light falls on the wet coating, is partly absorbed by the water contained therein, is almost 100 percent reemitted by the paper support, passes through the coating for a second time, when it is again partly absorbed, and finally reaches the receiver. If the thickness of the coating in the area that has just been exposed to the light differs from the average thickness of the coating, this manifests itself by an alteration in the absorption and hence in the change of the measured signal. To obtain an accurate measurement, the web is preferably held by suction on rollers and is stretched immediately behind the measuring position in order to prevent its flapping in the region of measuring. According to a further embodiment of the present invention, the emitting device is a filament lamp which has a filament of about 20 mm. in length and 0.2 mm. in thickness. The image of the filament is focused on the moving web, preferably in a ratio of 1 : 2, and has approximately the width of the narrowest permissible streaks, being very long in proportion to its width. The longer the filament, the better will it emphasize a streak when there is a background of disturbance due to other irregularities of the coating. There is, however, a limit to the length of the image because if the image of the filament is too long, the paper web can no longer be sufficiently accurately defined in space. A condition is therefore imposed on the length of the filament of the lamp.

If the aforesaid image is produced on the web in dimensions of about 0.5 mm. width and 5 cm. length as a result of too great a magnification of the filament of the lamp, the filament will be too thin and hence too fragile. If the image is produced by too great a reduction in the size of the filament, the filament will be too long. In that case, it will be very subject to oscillations and will usually break near a point of suspension. It has been found that the above mentioned compromise leading to a filament of about 0.2 mm. in thickness and 2 cm. in length at a magnification of 1 : 2 is advantageous. According to a further embodiment of the invention, the source of light used is a ribbon lamp. The ribbon lamps used are preferably considerably longer than they are wide, e.g. in the ratio of 1 : 5. The use of a ribbon lamp has the advantage that the light emitting element is not as fragile as in the case of a filament. Another advantage is that when the light scans a streak in the coating, two signals are delivered, one when the image of one edge of the ribbon moves over the streak and the other when the image of the other edge moves over the streak. The property of delivering two equal and opposite signals at a definite interval of time can be used to characterize a streak in a coating. According to one embodiment, the measuring head moves on a conveyor device over the moving web at a rate of about 1 metre per 5 seconds. As few vibrations as possible should be transmitted to the measuring head in order that the measurement may not be impaired by interfering impulses and in order to protect the sensitive filament of the lamp. The measuring head is therefore attached to the conveyor device by means of an elastic intermediate member. The beam reflected from the moving web is received by a photoelectric transducer which is connected to a preamplifier in series behind it by a rigid wire whose capacity in relation to its surroundings varies only to a negligible extent when the measuring head is subjected to vibrations. The preamplifier used is a semiconductor amplifier which is also insensitive to vibrations. The main amplifier connected behind this separates out the frequency band that is important for recognizing the streaks. This frequency band is mainly determined by the time taken for the measuring beam to scan the narrowest streak that occurs in practice. The main amplifier transmits the signal to the discriminator which is adjusted to a nominal value and which, when the measuring values exceed the nominal value, transmits fault signals which act as impulses to activate transistor elements to bring them into a suitable form activating a fault indicating device.

According to one particularly advantageous further embodiment of the invention, the existence of a streak and its position on the web are indicated. For this purpose, the movement of the measuring head is transmitted to a writing device of a registering apparatus in which the registering paper moves synchronously with the web of material that is under investigation. The impulses leaving the discriminator actuate the writing device which on receiving impulses, may for example, burns holes into a registering paper that is coated with metal. The web is thereby depicted in its correct form on the registering paper and the faults present are indicated in their correct position on the web. This type of recording device has the advantage that with a little practice, the signals can be accurately recognized as such and clearly distinguished from the interfering signals that may be due to the device itself or other interfering influences and may even predominate. A streak on the web of material may, for example, be represented on the registering paper as a sequence of points in the form of the streak and can clearly be distinguished as such from a statistically distributed underlying interference. A further feature of the invention that is advantageous in view of certain interfering influences relates to the arrangement of a time delay member between the discriminator and writing device. In this way, instead of one image of the web appearing on the registering paper, two are formed, namely one for one direction of movement of the measuring head and the other for the movement of the head in the opposite direction. The image of a streak occurring in the coated web then appears on the registering paper as two parallel, closely adjacent streaks or point sequences. The advantage of this method of representation is that various factors may interfere if, for example the measuring head is always impeded in its movement in the same direction. Such interfering factors then cause a single sequence of points to appear on the registering paper in the form of a streak and, can therefore easily be distinguished from faults on the web which are always depicted as double sequences of points. One may also use two registering devices, one of which registers the coarse faults and the other minute faults. In this case, two discriminators are, of course, required which are adjusted to different nominal values.

The nature of the invention will now be explained diagrammatically with the aid of an example shown in the accompanying drawing in which FIG. 1 is a top plan view of the apparatus according to the invention for detecting streaks obtained with a coating apparatus and FIG. 2 shows the measuring head and FIGS. 3 and 4 the results of a web scanning.

In the apparatus according to FIG. 1, a web of material 2 moves below a coating device 1 which applies emulsion. A fault detecting device 3 is provided which comprises a measuring head 4 attached by elastic intermediate members 7 to a conveyor device 6 which is arranged transversely to the moving web 2 and reciprocally moved by a motor 5, and which is arranged over the area that is still wet. A beam emitted by a source of light 19 (FIG. 2) of the measuring head 4 is reflected from the web 2 and is converted into electrical energy in the photoelectric transducer 8 which in reality is arranged in the measuring head 4 (FIG. 2) but has been shown outside it in FIG. 1 for the sake of clarity, and is fed into a preamplifier 9. An amplifier 10 connected behind the preamplifier is connected to a discriminator 11 which transmits the fault signals to a time delay element 12 when the nominal value is exceeded, the fault signals being converted by transistor elements into a suitable form for actuating a writing device 13 which produces a script on the registering strip 14. The measuring head 4 is coupled by the string 15 to the wheel 16, which is provided with a restoring spring. The wheel 16, in turn is coupled to the wheel 17 of the transporting device 18.

In FIG. 2, a filament lamp 19 is shown arranged on the measuring head 4. The beam emitted passes through an objective 20 which has a high aperture. Between the objective 20 and web 2 is a filter 21 which protects the photographic paper against exposure. The reflected beam falls on a filter 22 which selects the region of wavelengths of water absorption, of about $2\mu$. A condensing lens 23 arranged behind this transmits part of the diffusely reflected beam to the photoelectric transducer 8 which may, for example, be a lead sulfide cell.

In FIG. 3, the web 2 which is to be scanned is shown as having a fault in the form of a streak 24. At 25, the streak alters its position on the web in relation to its edge. At 26, there is a short interruption in the streak. At 27, parts are torn out of the edge of the web. It may be assumed that 28 is a part of the web such that when it moves under the measuring head 4, it executes a movement at right angles to its normal direction in addition to its normal movement.

FIG. 4 illustrates the result of scanning the registering strip 14. On the registering strip 14 which had edges 29, there is a region bounded by the edges 30 inside which the marking pen moves during the scanning process. Whenever the fault detecting device 3 passed beyond the edge of the strip 2, a high signal is emitted which far exceeds the adjusted level. The edges of the strip are therefore marked on the registering strip 14 as a point sequence 31. Within the shaded part between the edges 30 and 31, information picked up during scanning may lead to marking of the registering strip 14 or leave it unmarked, and is of no further interest. At 32 the edge of the web shifts in relation to the measuring head 4. The streak 24 on the strip and its interruption 26 and its positional shift 25 in relation to the edges of the band are represented by the point sequence 33. A mark was made at 34, e.g. at an important point. In addition to the objects mentioned hitherto, there may be a varying number of registering points on the registering paper due to an interference process.

Although in this particular case the invention is particularly applied to the detection of streaks in photographic papers and films, it may within the scope of the invention be used for testing other webs of material, for example webs of paper which are being coated with polyethylene etc.

We claim:

1. Apparatus for detecting and locating streaks on moving webs being coated in the production of photographic papers and films, in which a measuring head equipped with a light emitting device and a photoelectric transducer is arranged on a conveyor device so that it may be reciprocally moved over the moving web, characterized in that the measuring head is coupled with a recording device working synchronously with the moving web, said measuring head being arranged in the region of the web that is still wet, said light emitting device comprising a filament or ribbon lamp and means for imaging the filament or ribbon onto the web, the beam of the light emitting device emitting light in the wavelength region of absorption of the liquid wetting the web.

2. Apparatus according to claim 1, characterized in that the light emitting device consists of a filament lamp the filament of which is about 20 mm. long and 0.2 mm. thick.

3. Apparatus according to claim 1, characterized in that the light emitting device consists of a ribbon lamp.

4. Apparatus according to claim 1, characterized in that a discriminator is connected between the photoelectric transducer and the recording device said discriminator emitting fault signals to the writing device when a predetermined value is exceeded.

5. Apparatus according to claim 4, characterized in that a time delay member is arranged between the discriminator and the writing device.

6. Apparatus according to claim 1, the light emitting device emitting light in the wavelength region of water absorption of about $2\mu$.

7. Apparatus according to claim 1, the light emitting device being mounted to direct the light beam perpendicular to the direction of movement of the web.